US008366298B2

(12) United States Patent
Misener et al.

(10) Patent No.: US 8,366,298 B2
(45) Date of Patent: Feb. 5, 2013

(54) LASER DIODE MOUNTING SYSTEM

(75) Inventors: Garland Christian Misener, Portland, ME (US); Carl Rich, Falmouth, ME (US); Alan Papale, Saco, ME (US); Roger Hale, Naples, ME (US)

(73) Assignee: IDEXX Laboratories, Inc., Westbrook, ME (US)

( * ) Notice: Subject to any disclaimer, the term of this patent is extended or adjusted under 35 U.S.C. 154(b) by 84 days.

(21) Appl. No.: 13/188,072

(22) Filed: Jul. 21, 2011

(65) Prior Publication Data
US 2012/0051057 A1    Mar. 1, 2012

Related U.S. Application Data

(60) Provisional application No. 61/376,422, filed on Aug. 24, 2010.

(51) Int. Cl.
*G02B 27/20* (2006.01)
(52) U.S. Cl. ........ 362/259; 362/285; 362/288; 362/289; 362/455; 356/153; 359/811; 359/819
(58) Field of Classification Search .................. 356/153; 359/811, 819; 362/259, 285, 288, 289, 455
See application file for complete search history.

(56) References Cited

U.S. PATENT DOCUMENTS

| | | | |
|---|---|---|---|
| 4,911,532 A | 3/1990 | Hidaka | |
| 4,948,221 A | 8/1990 | Yates | |
| 4,997,279 A | 3/1991 | Gordon et al. | |
| 5,111,476 A | 5/1992 | Hollenbeck et al. | |
| 5,283,802 A | 2/1994 | Hsiung | |
| 5,381,438 A | 1/1995 | Guo et al. | |
| 5,548,569 A | 8/1996 | Shimizume et al. | |
| 5,633,761 A | 5/1997 | Takashima et al. | |
| 5,659,432 A | 8/1997 | Takashima et al. | |
| 5,689,378 A | 11/1997 | Takashima et al. | |
| 6,445,514 B1 | 9/2002 | Ohnstein et al. | |
| 6,478,452 B1 | 11/2002 | Richardson et al. | |
| 6,543,907 B2 * | 4/2003 | Nishiyama et al. | ........... 362/259 |
| 6,612,719 B2 | 9/2003 | Richardson et al. | |
| 6,647,282 B2 | 11/2003 | Hair | |
| 6,717,753 B2 * | 4/2004 | Sasaki | ........... 359/819 |
| 6,737,664 B2 | 5/2004 | Shaffer et al. | |
| 7,023,551 B2 | 4/2006 | Iizuka et al. | |
| 7,349,166 B2 | 3/2008 | Sakai et al. | |
| 7,483,456 B2 | 1/2009 | Haensel et al. | |
| 7,692,882 B2 | 4/2010 | Dupree et al. | |

* cited by examiner

*Primary Examiner* — Stephen F Husar
(74) *Attorney, Agent, or Firm* — Carter, DeLuca, Farrell & Schmidt LLP

(57) ABSTRACT

An optical system includes a laser diode, a collimating lens and first and second housing parts. The first housing part retains the collimating lens therein. The second housing part engages the first housing part to retain the laser diode therebetween. The position of the laser diode is adjustable with respect to the collimating lens in X, Y and Z directions. One or more biasing members are interdisposed between the housing parts in the X direction, the Y direction, and/or the Z direction for biasing the laser diode relative to the collimating lens in the X direction, the Y direction and/or the Z direction. One or more securing members fixedly engage the first and second housing to one another and provide a compression force on the housing parts to maintain the relative position of the laser diode with respect to the collimating lens in the X, Y and Z directions.

23 Claims, 12 Drawing Sheets

LASER DIODE MOUNTING SYSTEM

BACKGROUND

The present disclosure relates to a laser diode mounting system and, more particularly, to a system and method for mounting and stabilizing a laser diode relative to a collimating lens.

TECHNICAL FIELD

Laser systems generally consist of a laser, e.g., a laser diode, and a lens or lenses, e.g., a collimating lens, held in alignment by a mounting assembly. For many applications, it is necessary to maintain the laser diode and collimating lens in precise alignment with one another. For example, flow cytometry instrumentation typically requires a laser beam to pass through a narrow sample core stream having a width on the order of 10 μm. Particles flowing through the sample core stream are illuminated by the laser, absorbing and scattering the laser light in accordance with the refractive indices, sizes, shapes, and other properties of the particles. For each particle, the light intensities absorbed and scattered are measured. The scattered light intensities are measured at specific angles relative to the laser beam. The absorption and scattering measurements are used to identify and quantify particle types and particle characteristics.

As can be appreciated, in order to maintain accurate performance of the flow cytometer, the laser system must perform consistently after exposure to environmental conditions that may effect the alignment of the system, e.g., temperature changes and mechanical vibrations, and the net effects of such conditions must be insignificant. However, due to the required precision and sensitivity of laser systems, e.g., flow cytometers, the margin of error or mis-alignment is very small. For example, in one flow cytometer (the LaserCyte), a transverse shift of the laser diode relative to the collimating lens by a distance of about 0.6 μm may cause a critical scattering parameter to change by about 10%. Tilting the laser diode relative to the collimating lens at an angle of about 0.3 mrad may similarly cause a critical scattering parameter to change by about 10%. It is therefore important to minimize the effects of temperature changes, mechanical vibrations, and other environmental factors on the alignment of the laser system in order to maintain proper alignment of the laser system. Further, economic and physical limitations typically make adjustment and/or re-alignment of the laser diode and collimating lens burdensome.

SUMMARY

The present disclosure relates to an optical system including a laser diode, a collimating lens and a housing assembly. The housing assembly includes first and second housing parts. The first housing part is configured to retain the collimating lens therein. The second housing part is engageable with the first housing part to retain the laser diode therebetween. The position of the laser diode is selectively adjustable with respect to the collimating lens in an X direction, a Y direction, and a Z direction. One or more biasing members are interdisposed between the first and second housing parts in the X direction, the Y direction and/or the Z direction. The biasing member(s) bias the laser diode with respect to the collimating lens in one or more of the X, Y and Z directions. One or more securing members are configured to fixedly engage the first and second housing parts to one another. The securing member(s) provide a compression force on the first and second housing parts to maintain the relative position of the laser diode with respect to the collimating lens in the X direction, the Y direction and the Z direction.

In one embodiment, the laser diode mounting system further includes one or more adjustment members for adjusting the position of the laser diode with respect to the collimating lens in the X direction, the Y direction and/or the Z direction. More specifically, the laser diode mounting system may include three or more adjustment members positioned radially about an outer peripheral surface of one of the first and second housing parts. The adjustment members are selectively moveable to adjust the position of the laser diode with respect to the collimating lens in a plane defined by the X direction and the Y direction.

In another embodiment, each of the securing members includes a plurality of compressible washers disposed therearound. The compressible washers are configured to provide finer control of the compression force between the first and second housing parts upon engagement of the securing member to the first and second housing parts.

In yet another embodiment, a focus member is provided. The focus member is configured to selectively translate the laser diode with respect to the collimating lens along a longitudinal axis defined therethrough.

In still another embodiment, one or more springs, e.g., a spring washer, are interdisposed between the first housing part and the second housing part. The spring(s) bias the laser diode apart from the collimating lens.

In still yet another embodiment, a plurality of set screws are coupled to the first housing part. The set screws are selectively adjustable to maintain the biasing of the laser diode apart from the collimating lens, e.g., in the event that the one or more springs either fail or do not provide sufficient biasing force.

In another embodiment, a laser diode mounting member is provided for retaining the laser diode therein. The laser diode mounting member is positionable between the first and second housing parts and is configured such that, when the first and second housing parts are engaged to one another, the relative position of the laser diode with respect to the collimating lens is maintained.

In still another embodiment, the laser diode mounting member is selectively adjustable with respect to the collimating lens in the X direction, the Y direction and the Z direction for selectively adjusting the position of the laser diode with respect to the collimating lens in the X direction, the Y direction and the Z direction.

In yet another embodiment, a first retainer ring is provided to threadingly engage the laser diode mounting member to retain laser diode therein. Similarly, a second retainer ring may be provided to threadingly engage the first housing part to retain the collimating lens therein.

In still yet another embodiment, the engagement of the securing member(s) with the first and second housing parts is configured to maintain an accurate alignment of the laser diode and collimating lens after application of 10 $G_{RMS}$ random axis vibration for 10 minutes and/or through a temperature cycle of room temperature to −40° C. to 65° C. and back to room temperature.

In a further embodiment, the alignment of the laser diode with respect to the collimating lens is effected by adjusting the relative position of the laser diode with respect to the collimating lens along a longitudinal axis defined therethrough and in a plane extending transverse to the longitudinal axis. The relative tilt of the laser diode with respect to the collimating lens remains fixed during alignment of the laser diode with respect to the collimating lens.

A method for aligning an optical system mounted to a mounting plate is also provided in accordance with the present disclosure. The optical system may be configured according to any of the embodiments discussed above. The method includes translating the laser diode with respect to the collimating lens along a longitudinal axis defined therethrough to focus an image produced by the optical system on a target, while the relative rotational position of the laser diode with respect to the collimating lens remains fixed. The method further includes recording a first image produced by the optical system on the target with the optical system in a first rotational orientation, rotating the optical system a pre-determined angle of rotation, e.g., approximately 180°, with respect to the mounting plate, recording a second image produced by the optical system on the target with the optical system in the second rotational orientation, estimating an aligned beam center point based upon the centers of the first and second recorded images and the angle of rotation between the first and second rotational orientations, and translating the laser diode transversely with respect to the collimating lens to align an image produced by the optical system with the estimated aligned beam center point. This process can be repeated to confirm or refine the optical system's alignment. Further, translation of the laser diode with respect to the collimating lens can optimize focus of the image produced by the optical system on a target for the fast axis of the laser diode or the slow axis of the laser diode, if it is astigmatic. Alternatively, the laser diode may be focused to an intermediate position.

In embodiments where the predetermined angle of rotation of the optical system is approximately 180°, the aligned beam center point is determined by estimating the location of the midpoint which bisects a straight line connecting the centers of the first and second recorded images.

In another embodiment, the first and second housing parts of the optical system are secured to one another under a first securing pressure. Once properly aligned, the first and second housing parts are secured to one another under a second securing pressure that is greater than the first securing pressure to fix the laser diode in position relative to the collimating lens.

In still yet another embodiment, the method further includes the step of measuring a beam pointing angle and a beam pointing direction of the optical system with the use of a simple external target, e.g., requiring only that it be planar, located a known distance from the optical system, mounted approximately perpendicularly to the optical axis of the optical system, and of sufficient planar extent and resolution for receiving images from the optical system. A sheet of paper mounted on a wall, onto which images from the optical system can be traced, is adequate. No additional optical instrumentation is needed. More specifically, the optical system is rotated through a plurality of approximately equally-spaced, pre-determined intervals with respect to the mounting plate. An image produced by the optical system on the target is recorded at each of the pre-determined intervals for calculating the aligned beam pointing direction and the aligned beam pointing angle relative to the mounting plate.

BRIEF DESCRIPTION OF THE DRAWINGS

Various embodiments of the presently disclosed laser diode mounting system are described herein with reference to the drawings, wherein.

DETAILED DESCRIPTION

Figure 1:
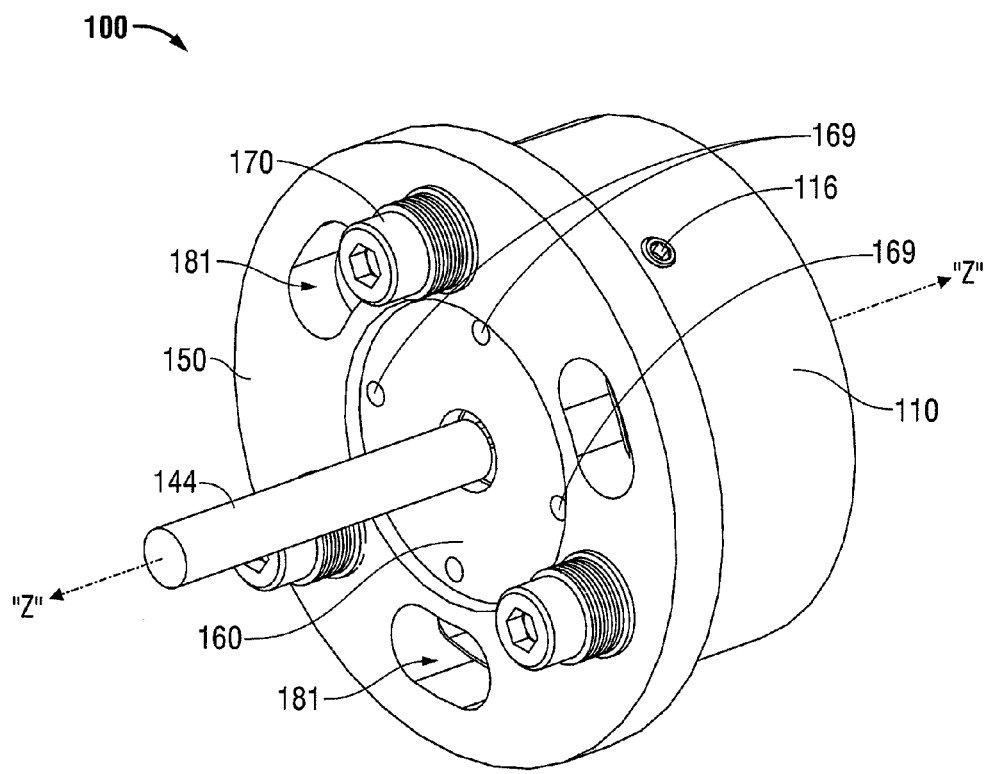
FIG. 1 is a rear, perspective view of one embodiment of a laser diode mounting system in accordance with the present disclosure.
Figure 2:
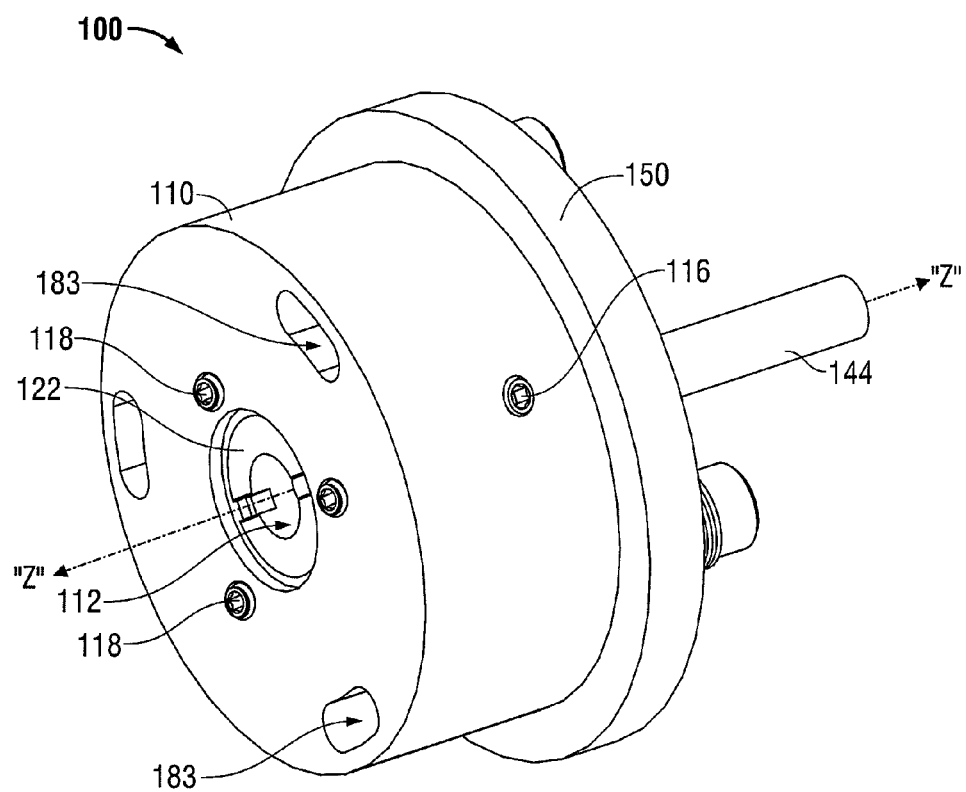
FIG. 2 is a front, perspective view of the laser diode mounting system of FIG. 1.

Embodiments of the presently disclosed optical system, or, more specifically, laser diode mounting system, are described in detail with reference to the drawing figures wherein like reference numerals identify similar or identical elements. The major components and general features of the presently disclosed laser diode mounting system will initially be described, while the assembly and alignment of the laser diode mounting system, including a more detailed description of each component, the relationship between the components, and the features associated therewith will follow thereafter. As used herein, the term "distal" refers to the portion that is being described which is further from a user, while the term "proximal" refers to the portion that is being described which is closer to a user.

Turning now to FIGS. 1-4, one illustrative embodiment of a laser diode mounting system in accordance with the present disclosure is shown generally identified by reference numeral 100. Laser diode mounting system 100 defines a longitudinal axis "Z-Z" and includes a base, or lens mounting assembly 110 and a cover, or laser diode mounting assembly 150. Base 110 is configured to fixedly retain a collimating lens 120 therein, while cover 150 is configured to fixedly retain a laser diode 140 therein. As will be described in greater detail below, base 110 and cover 150 are configured to be coupled to one another. Laser diode 140 may then be aligned with respect to collimating lens 120, e.g., by adjusting base 110 and/or cover 150 with respect to one another, according to the precise specification requirements of the laser diode system. Laser diode mounting system 100 may then be secured, i.e., base 110 and cover 150 may be locked, or secured to one another, to retain collimating lens 120 and laser diode 140 in a fixed position relative to one another. Base 110 and cover 150 each further include arch-shaped apertures 183, 181, respectively defined therethrough to secure laser diode mounting system 100 to a mounting plate 400 (see FIG. 9). The arch-shaped apertures 181, 183, permit small rotational adjustments of laser diode mounting system 100 with respect to mounting plate 400, e.g., to align the fast axis or the slow axis of laser diode 140 with other components for which laser diode mounting system 100 provides a collimated laser source.

The coupling of base 110 and cover 150, which will be described in detail below, maintains the relative alignment of collimating lens 120 and laser diode 140 even after being subjected to environmental stresses such as temperature change and mechanical vibrations acting on laser diode mounting system 100. In other words, due to the configuration of laser diode mounting system 100, the results of an ordinary temperature cycle, mechanical vibration, or other typical environmental stresses on the relative alignment of collimating lens 120 and laser diode 140 are dampened to the point of insignificance. Accordingly, the need for repeated adjustment and alignment of laser diode mounting system 100 is obviated.

In one particular embodiment, for example, laser diode mounting system 100 is configured to withstand 10 $G_{RMS}$ random axis vibration for at least 10 minutes and/or to withstand a temperature cycle of room temperature to −40° C. to 65° C. and back to room temperature, without significantly effecting the stability and alignment of laser diode 140 with respect to collimating lens 120. It is believed that the above testing standards will encompass substantially all temperature changes and mechanical vibrations likely to be encountered during packaging, transporting, using and storing of laser diode mounting system 100. As such, in using these testing standards, it is envisioned that laser diode mounting system 100 need not be repeatedly re-aligned, or re-adjusted after being subjected to environmental stresses encountered, for example, during installation, transport, use, etc.

The assembly of laser diode mounting system 100, along with a more detailed description of the components of laser diode mounting system 100 will now be described with reference to FIGS. 5-9 in conjunction with FIGS. 3 and 4. As shown in FIG. 5, base 110 of laser diode mounting system 100 defines a cylindrical configuration and includes a proximal end 111*a*, a distal end 111*b* and a lumen 112 extending therebetween. A first recess 113*a* is defined within proximal end 111*a* of base 110 and a second, smaller recess 113*b* is defined within distal end 111*b* of base 110. First and second recesses 113*a*, 113*b*, respectively, of base 110 are interconnected by lumen 112 extending through base 110. As can be appreciated, when laser diode mounting system 100 is fully assembled, e.g., when cover 150 and base 110 are coupled to one another, and the laser diode 140 is powered on, the laser beam emanating from laser diode 140, which is disposed within first recess 113*a*, extends through lumen 112 of base 110, passing through collimating lens 120. As will be described below, first recess 113*a* is configured for receipt of laser diode mounting ring 130, which secures laser diode 140 therein, upon coupling of base 110 and cover 150. Second recess 113*b* is configured to retain collimating lens 120 therein. Base 110 further includes a plurality, e.g., three or more, screw apertures 115 spaced radially about a side peripheral surface of base 110, each screw aperture 115 configured for threaded engagement of a set screw 116 therethrough. Set screws 116 are configured to adjust, or translate the relative position of cover 150 with respect to base 110 along a plane extending transversely with respect to longitudinal axis "Z-Z" of laser diode mounting system 100. A plurality of screw apertures 117 are also defined through a distal surface of base 110, the importance of which will be described in greater detail below.

Initially, as shown in FIG. 5, collimating lens 120 is inserted, from distal end 111*b* of base 110 into second recess 113*b* thereof. Base 110 is fabricated in two machining setups, the first to turn the outer diameter, bore first recess 113*a*, and face off surface 111*a*. Bored jaws are used for the second machining setup (which is required to form and thread second recess 113*b* and face off surface 111*b*) in order to maintain base 110 concentricity and parallelism. A retainer ring 122 is configured to engage second recess 113*b* to secure collimating lens 120 in position within second recess 113*b*. More particularly, retainer ring 122 is threadingly engaged within second recess 113*b* via the engagement of threading 124 disposed on an outer peripheral surface of retainer ring 120 and complementary threading 114 disposed on an inner surface of second recess 113*b* of base 110. However, it is also envisioned that collimating lens 120 be secured within second recess 113*b* of base 110 via any other suitable mechanism configured to securely retain collimating lens 120 within second recess 113*b* of base 110. Next, one or more spring washers 126 are positioned within first recess 113*a* of base 110. Spring washers 126 are disposed about a platform 119 positioned adjacent lumen 112 of base 110 on a proximal side thereof. Screws 118 disposed through apertures 117 extending through base 110 are configured to be threadingly engaged therein to maintain compression on washer 126 when cover 150 and base 110 are engaged to one another, as will be described in greater detail below.

Figure 3:
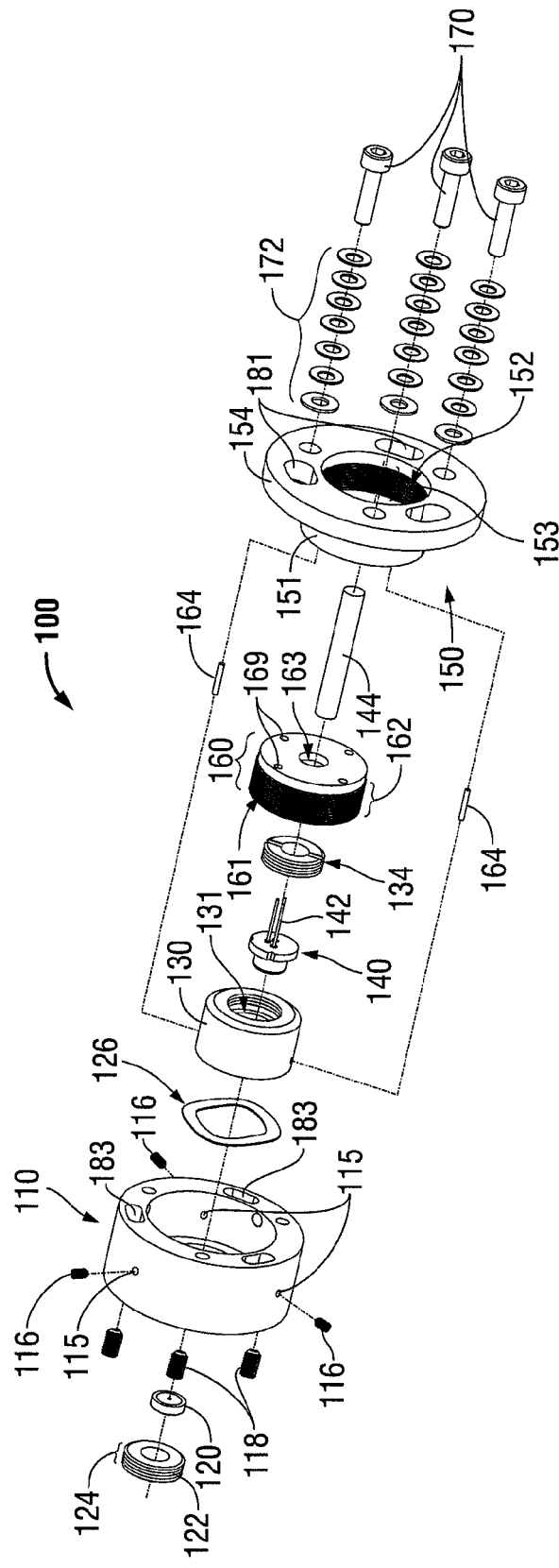
FIG. 3 is an exploded view of the laser diode mounting system of FIG. 1 shown with parts separated.
Figure 4:
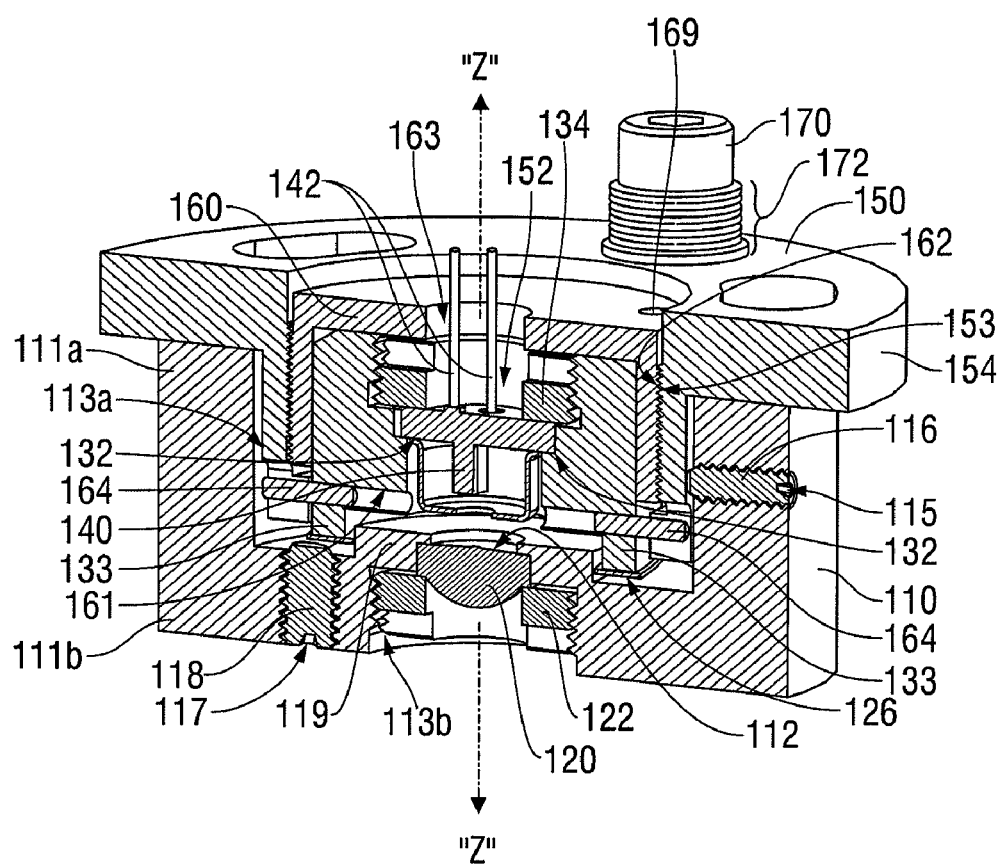
FIG. 4 is a transverse, cross-sectional view of the laser diode mounting system of FIG. 1.
Figure 5:
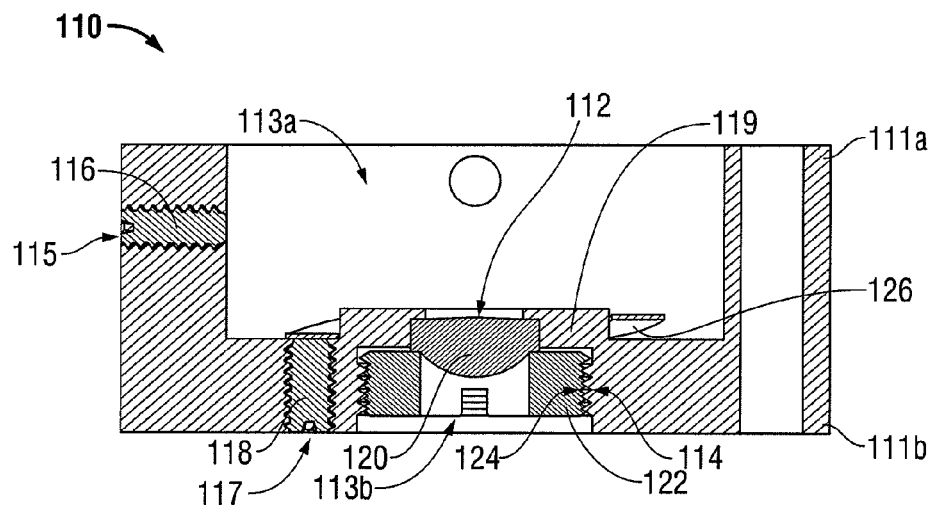
FIG. 5 is a transverse, cross-sectional view of a base assembly of the laser diode mounting system of FIG. 1.
Figure 6:
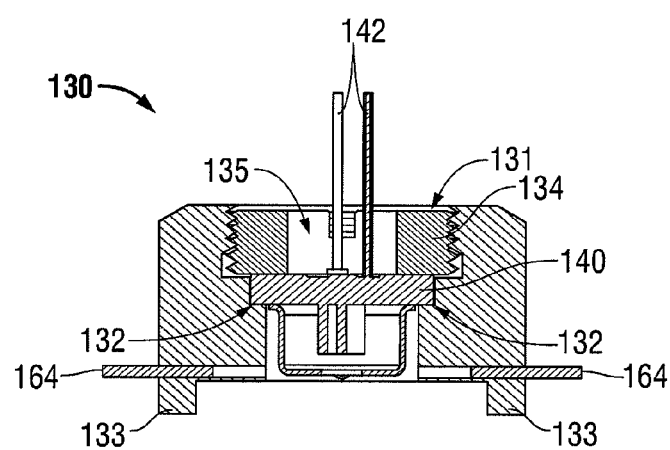
FIG. 6 is a transverse, cross-sectional view of a diode mounting assembly of the laser diode mounting system of FIG. 1.

Turning now to FIG. 6, in conjunction with FIGS. 3 and 4, laser diode mounting ring 130 is shown. Laser diode mounting ring 130 includes a lumen 131 extending therethrough that defines a shoulder 132 therein. Laser diode mounting ring 130 is fabricated in three machining setups, the first to turn, bore, and thread the top end of lumen 131. Parting off to finished length also occurs at this setup, in order to assure parallelism and concentricity. In the second machining setup, the counter bore of the bottom end of lumen 131 is performed. Prior to the third machining setup, the face of mounting ring 130 is indicated to 0.0005", again to assure parallelism. Then laser diode shoulder 132 is milled. Laser diode 140 is positionable within lumen 131 of laser diode mounting ring 130 to sit on, or abut shoulder 132, inhibiting translation of laser diode 140 completely through lumen 131, i.e., shoulder 132 retains laser diode 140 within lumen 131 of laser diode mounting ring 130. Shoulder 132 also inhibits laser diode 140 from tilting, angling, or rotating with respect to laser diode mounting ring 130 when disposed therein. Shelf 132 may further provide mechanical keying which engages a feature of the laser diode 140 housing, preventing rotation of the laser diode 140 with respect to mounting ring 130. A retainer ring 134, similar to retainer ring 122 of base 110, is engaged within lumen 131 of laser diode mounting ring 130 to retain laser diode 140 therein. In other words, laser diode 140 is retained in position within laser diode mounting ring 130 between shoulder 132, which inhibits laser diode 140 from translating distally through laser diode mounting ring 130 and inhibits tilting of laser diode 140 with respect to laser diode mounting ring 130, and retainer ring 134, which inhibits laser diode 140 from translating proximally out of engagement with laser diode mounting ring 130. As shown in FIG. 6, electronic connections 142 of laser diode 140 extend proximally though an aperture 135 defined within retainer ring 134 when laser diode 140 is installed within laser diode mounting ring 130.

With continued reference to FIG. 6, laser diode mounting ring 130 further includes an annular protrusions 133 extending distally therefrom. Annular protrusion 133 is configured for positioning adjacent to and proximal of spring washers 126 and about platform 119 upon positioning of laser diode mounting ring 130 within first recess 113a of base 110, as will be described in detail below. As can be appreciated, such a configuration permits annular protrusion 133 of laser diode mounting ring 130 to sit on spring washers 126, while also allowing the body portion of laser diode mounting ring 130 to be positioned about platform 119 in an abutting relation therewith. This configuration further facilitates alignment of laser diode mounting ring 130 and, thus laser diode 140 with respect to lumen 112 of base 110 and, thus, with respect to collimating lens 120.

Figure 7:
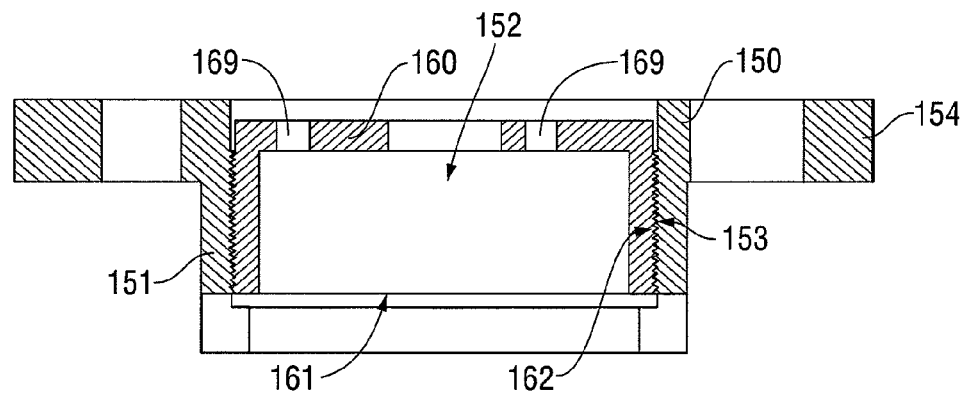
FIG. 7 is a transverse, cross-sectional view of the focus member for the diode mounting assembly, installed within a top flange assembly of the laser diode mounting system of FIG. 1.

Turning now to FIG. 7, cover 150 of laser diode mounting system 100 defines a cylindrical body portion 151 and includes a lumen 152 defined therethrough. Cylindrical body portion 151 of cover 150 defines a diameter that is smaller than a diameter of first recess 113a of base 110 such that, during assembly of laser diode mounting system 100, body portion 151 of cover 150 is insertable into first recess 113a of base 110. However, it is envisioned that cylindrical body portion 151 be somewhat similar in diameter to first recess 113a of base 110 such that cover 150 cannot move significantly in a transverse direction with respect to longitudinal axis "Z-Z" once positioned within base 110. Cover 150 also includes an outer annular flange 154 disposed at a proximal end of body portion 151 of cover 150 and extending radially outwardly therefrom. Annular flange 154 abuts proximal end 111a of base 110 upon insertion of body portion 151 of cover 150 into base 110, inhibiting further distal translation of body portion 151 of cover 150 into first recess 113a of base 110. Cover 150 is fabricated in two machining setups, the first to turn, face, bore, and thread this component from the side of annular flange 154. Five spring passes, followed by a finishing pass, are used on the fine-pitch thread, e.g., 80 threads per inch. For the second machining setup, forming body portion 151, bored jaws are used to assure parallelism.

As mentioned above, cover 150 is configured to retain laser diode 140 therein. More specifically, cover 150 is configured to receive and engage laser diode mounting ring 130 therein, which, in turn, retains laser diode 140 therein. In order to engage laser diode mounting ring 130 within cover 150, a focus member 160 is operably coupled to cover 150, as shown in FIG. 7. Focus member 160 includes an open distal end 161 such that laser diode mounting ring 130 may be inserted distally into cover 150. In addition, focus member 160 includes threading 162 disposed on an outer peripheral surface thereof for engaging complementary threading 153 disposed on an inner surface of lumen 152 of cover 150. The threading 162 is also fabricated using five spring passes to clean the fine pitch thread, to ensure that it engages complementary threading 153 of cover 150 fully and smoothly.

Figure 8:
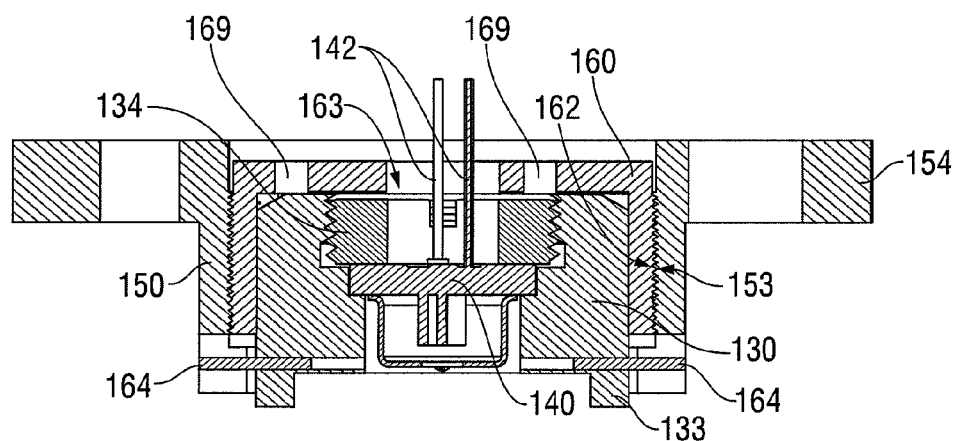
FIG. 8 is a transverse, cross-sectional view of the diode mounting assembly installed within the top flange assembly.

Turning now to FIG. 8, once focus member 160 has been engaged to a specified position within cover 150, laser diode mounting ring 130 may be installed therein. More specifically, laser diode mounting ring 130 is inserted from a distal side of cover 150 into position within focus member 160. Care is taken to engage anti-rotation keys 164 mounted in laser diode mounting ring 130 within slots in cover 150, fixing the relative rotational orientation of laser diode mounting ring 130 and, thus, laser diode 140, with respect to cover 150. Such a feature inhibits rotation of laser diode mounting ring 130 upon adjustment of focus member 160 with respect to cover 150.

As shown in FIG. 8, an aperture 163 defined within focus member 160 permits passage of electrical connections 142 of laser diode 140 therethrough, such that control electronics connections 144 (FIG. 1) for laser diode 140 may pass through the proximal side of focus ring 160, once laser diode mounting ring 130 has been engaged to cover 150 with focus member 160 disposed therebetween.

Figure 9:
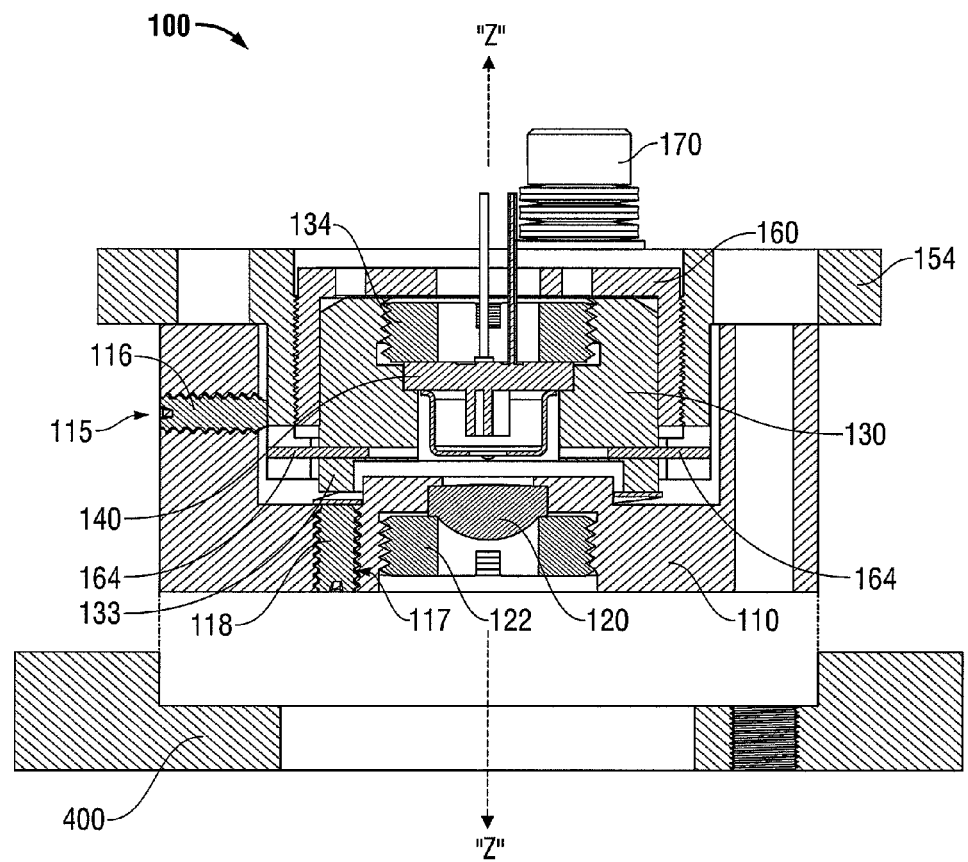
FIG. 9 is a transverse, cross-sectional view of the laser diode mounting system of FIG. 1 in a fully assembled condition, the laser diode mounting system shown configured for engagement with a mounting plate.
Figure 10:
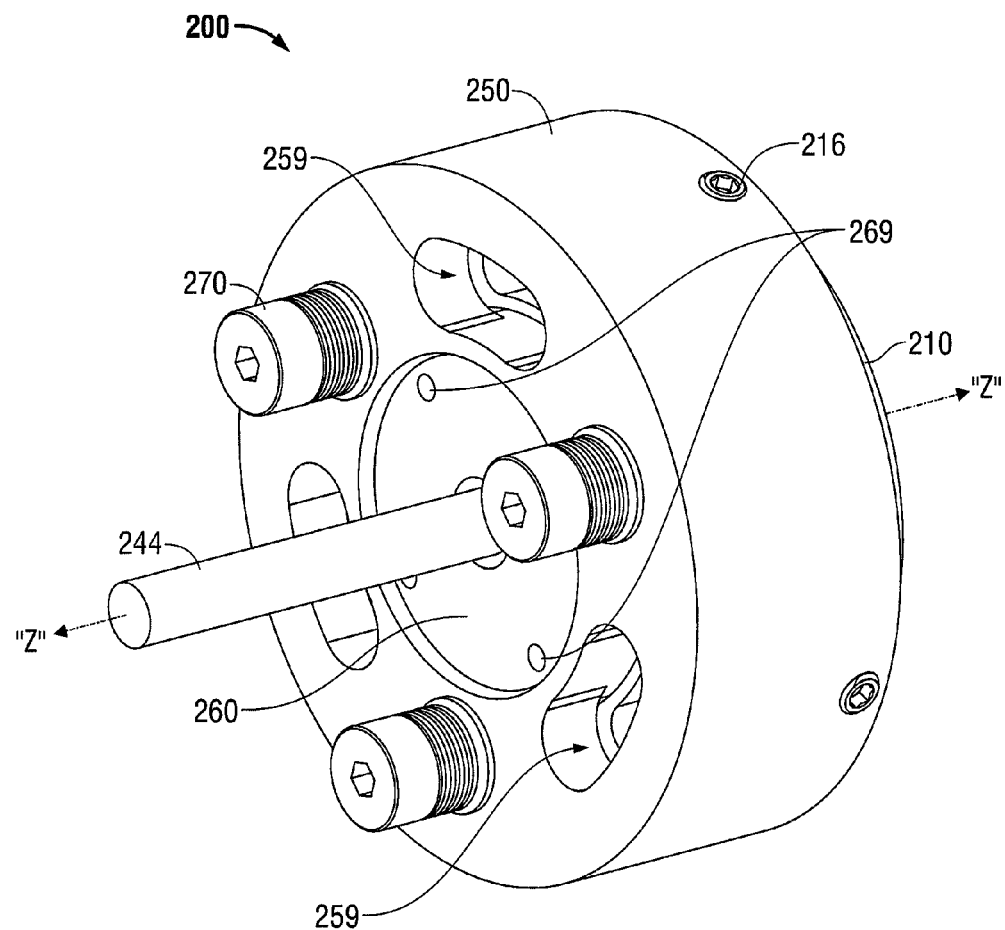
FIG. 10 is a rear, perspective view of another embodiment of a laser diode mounting system in accordance with the present disclosure.
Figure 11:
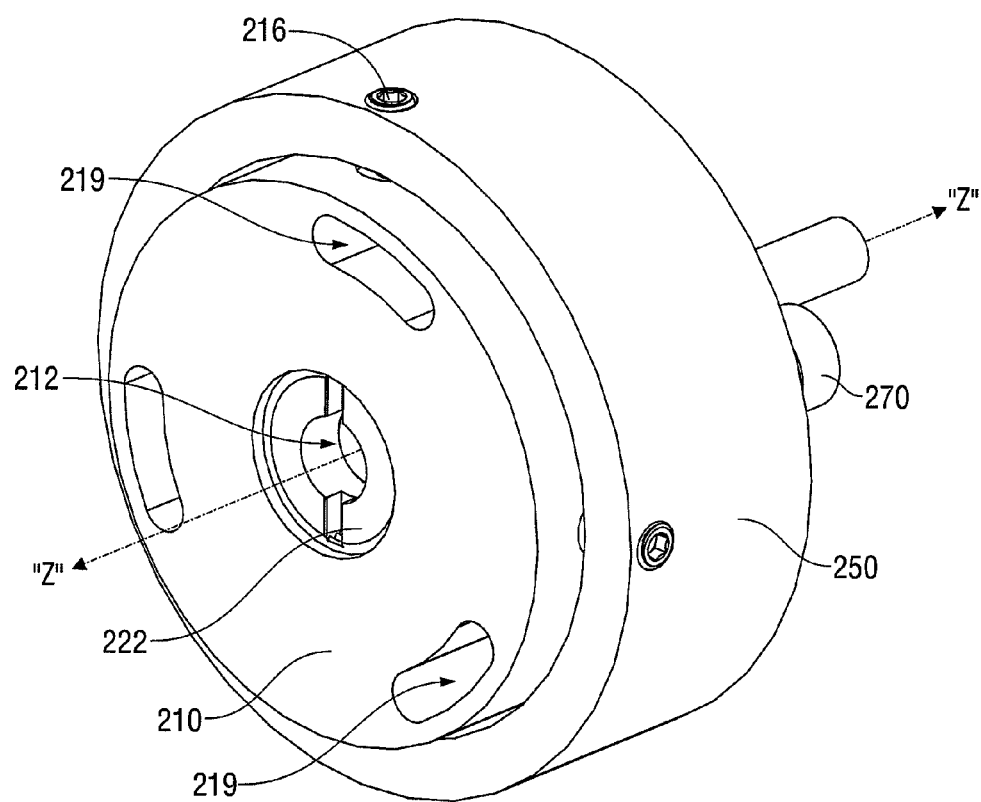
FIG. 11 is a front, perspective view of the laser diode mounting system of FIG. 10.
Figure 12:
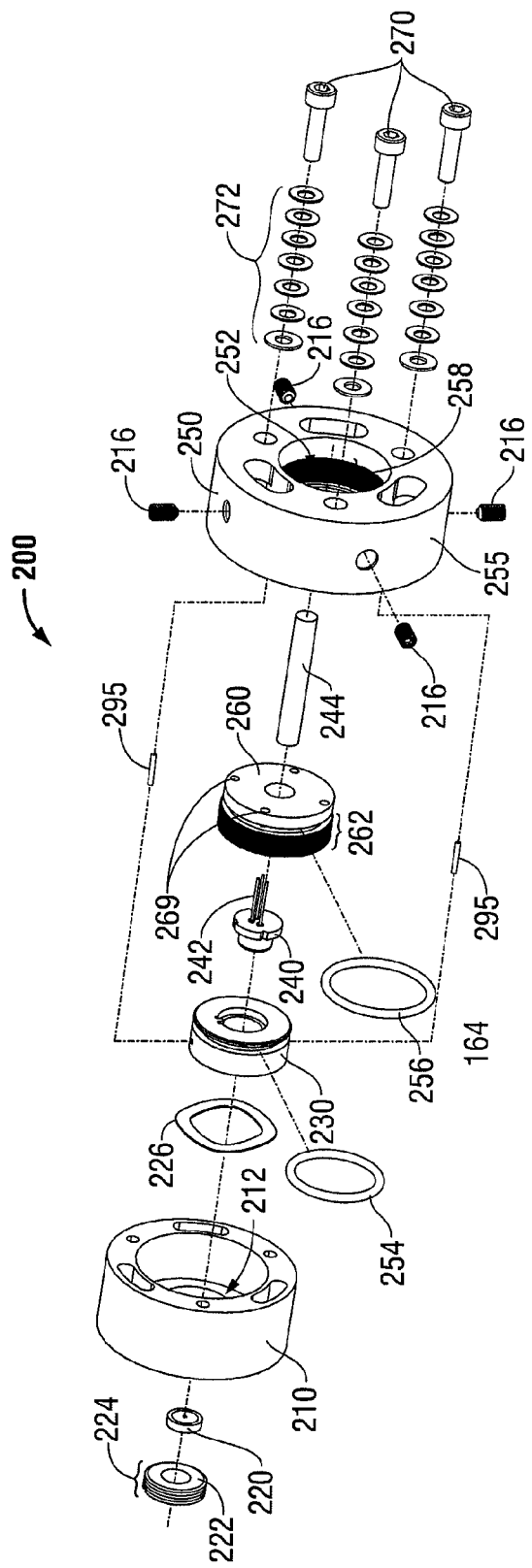
FIG. 12 is an exploded view of the laser diode mounting system of FIG. 10 shown with parts separated.

With reference now to FIG. 9, with collimating lens 120 secured within base 110 and with laser diode 140 secured within laser diode mounting ring 130 (which is retained within cover 150 via focus member 160), cover 150 and base 110 are coupled, or secured to one another. More particularly, base 110 and cover 150 are interfitted with one another such that body portion 151 of cover 150, focus ring 160, laser diode mounting ring 130, and laser diode 140 are positioned within first recess 113a of base 110 and such that annular protrusion 133 of laser diode mounting ring 130 is disposed adjacent spring washer(s) 126. Once this position is achieved, fasteners 170 are inserted through apertures defined within base 110 and cover 150, respectively, to threadingly fasten, or secure base 110 and cover 150 to one another. Fasteners 170 may optionally include Belleville washer stacks 172 (or other spring-like washers) for better control of fastening pressure although other fastening mechanisms are also contemplated.

Further, it is envisioned that base 110, laser diode mounting ring 130, cover 150 and focus member 160 all be formed from brass, or another suitable material, in order to minimize thermal expansion or contraction of one these components relative to the others. Retainer rings 122, 134 may be formed from the same material, and even can be identical components. As described herein, the laser diode mounting system 100 is held at ground potential. However, if it is desired to maintain the laser diode at some other electrical potential, an insulator (not shown), e.g., a mylar ring, may be positioned between laser diode 140 and laser diode mounting ring 130 and between laser diode 140 and retainer ring 134 to isolate laser diode 140 from the ground potential of the rest of the laser diode mounting system 100. Alternatively, retainer ring 134 may be formed from an electrically insulative material such as an acetal resin, e.g., Delrin®, available from E. I. du Pont de Nemours and Company. Other electrical isolation configurations are also contemplated.

During assembly, fasteners 170 are tightened to a first position wherein adjustment and alignment of laser diode mounting system 100 may be effected. The alignment of laser diode mounting system 100 will be described below. Once aligned properly, fasteners 170 are then tightened further to inhibit relative movement of the internal components of laser diode mounting system 100, thus maintaining system 100 in an aligned configuration. Biasing members 172 such as coned-disc spring washers known as "Belleville" washers 172, or any other suitable biasing members, may be provided to allow finer control of the compression between cover 150 and base 110, either during adjustment or when fixedly securing cover 150 and base 110 to one another. Fasteners 170 and biasing members 172 (in embodiments where biasing members 172 are used) provide sufficient compression on base 110 and cover 150 such that base 110 and cover 150 are capable of withstanding mechanical vibration, temperature changes, or other environmental factors, without requiring re-alignment or readjustment after being exposed to such environmental stresses.

Several adjustment features are provided to align and focus laser diode mounting system 100, e.g., to align laser diode 140 and collimating lens 120. Focus member 160 is configured to adjust the longitudinal position of laser diode mounting ring 130 with respect to cover 150. As can be appreciated, rotating focus ring 160 with respect to cover 150, to further engage, or to disengage the threaded engagement therebetween effects axial translation of laser diode 140 with respect to collimating lens 120. The backpressure applied to laser diode mounting ring 130 by spring washer(s) 126 biases laser diode mounting ring 130 and, thus laser diode 140 apart from collimating lens 120, e.g., due to the adjacent positioning of annular protrusion 133 of laser diode mounting ring 130 and spring washer 126 disposed about lumen 112 of base 110. As such, rotation of focus ring 160 with respect to cover 150 to translate focus ring 160 distally similarly urges laser diode mounting ring 130 distally to reposition laser diode 140 closer to collimating lens 120, against the bias of spring washer 126, e.g., to focus the laser beam emitted by laser diode 140 and passing through collimating lens 120. Spring washer(s) 126 provide back pressure on laser diode mounting ring 130 to inhibit backlash during adjustment of focus member 160 and to provide resistance for longitudinal and/or transverse adjustment of laser diode 140 with respect to collimating lens 120. Such a feature also facilitates stabilization of the relative positions of laser diode 140 and collimating lens 120 during adjustment and in response to environmental stresses, e.g., temperature changes and/or mechanical vibrations. As can be appreciated, focus member 160 may be adjusted, e.g., laser diode 140 may be longitudinally translated with respect to collimating lens 120, to optimize the resolution of the fast axis or the slow axis of laser diode 140. Alternatively, focus member 160 may be adjusted to reach an intermediate focus position between the optimized fast axis position and the optimized slow axis position. Anti-rotation keys 164 inhibit rotation of laser diode mounting ring 130 with respect to cover 150 during adjustment of focus ring 160.

In order to adjust focus member 160 to focus the image produced by laser diode 140, i.e., in order to further engage or disengage focus ring 160 within cover 150, a tool (not shown) is engaged with focus ring 160 and is rotated about longitudinal axis "Z-Z" to thereby rotate focus ring 160 in the desired direction. More specifically, the tool (not shown) is provided with, for example, four prongs for engaging each of apertures 169 (FIG. 1) of focus member 160. Accordingly, with the prongs of the tool (not shown) engaged within apertures 169 of focus member 160, the tool (not shown) can be rotated to adjust the position of focus member 160 relative to cover 150. It is contemplated that focus member 160 include greater or fewer than four apertures and that the tool (not shown) include a corresponding number of prongs for engagement therewith. Alternatively, the tool (not shown) may be configured in any other suitable fashion for engaging focus ring 160 to adjust the position of focus ring 160 relative to cover 150.

Further, screws 118 disposed through screw holes 117 of base 110 are selectively tightenable to maintain the compression on spring washers 126 such that back pressure is provided on laser diode mounting ring 130 in the event that spring washers 126 fatigue or fail, or simply where spring washers 126 do not provide a sufficient compression force, e.g., to maintain precise alignment between laser diode 140 and collimating lens 120 following thermal and mechanical stresses. In other words, screws 118 are tightened following alignment of the laser diode 140 relative to collimating lens 120 in order to further maintain the alignment therebetween by ensuring a sufficient compression is provided therebetween.

As mentioned above, set screws 116 are configured for adjusting the transverse position of cover 150 with respect to base 110 and, thus for adjusting the transverse position of laser diode 140 with respect to collimating lens 120. To control the alignment of laser diode 140 with respect to collimating lens 120, a plurality of set screws 116, e.g., three or more set screws 116, are provided. Set screws 116 are threadingly engaged within apertures 115 defined within base 110 such that an end of each set screw 116 abuts the outer peripheral surface of body portion 151 of cover 150. As can be appreciated, screws 116 may be selectively tightened (or loosened) to translate cover 150 with respect to base 110 in order to adjust the transverse alignment of laser diode 140 with respect to collimating lens 120. It is envisioned that at least three set screws 116 be annularly disposed about laser diode mounting system 100 and be equally-spaced with respect to one another. Such a configuration allows for adjustment in any direction within a plane extending transversely with respect to longitudinal axis "Z-Z." Additional set screws 116 may also be provided to further facilitate adjustment.

Laser diode mounting system 100, as described above and as shown in FIGS. 1-5, is both longitudinally adjustable, e.g., laser diode 140 is moveable with respect to collimating lens 120 along longitudinal axis "Z-Z;" and transversely adjustable, e.g., laser diode 140 is moveable with respect to collimating lens 120 in the plane defined by axis "Z-Z." Laser diode mounting system 100 is also configured such that collimating lens 120 and laser diode 140 are securable within base 110 and cover 150, respectively, and such that base 110 and cover 150 are securable to one another to minimize the tilt angle between laser diode 140 and collimating lens 120. It has been found that, where the tilt angle between laser diode 140 and collimating lens 120 is sufficiently small such that clipping or vignetting in the system is avoided and as long as the clear aperture of collimating lens 120 is not overfilled, the tilt angle need not be adjusted. Accordingly, longitudinal and transverse adjustment of laser diode 140 with respect to collimating lens 120 is sufficient to establish a stable, aligned system 100. Additionally, as mentioned above, the operable relationships between the various components of laser diode mounting system 100 and the features therewith provide a laser diode mounting system 100 capable of maintaining stability and alignment in response to environmental stress cycles such as temperature changes and mechanical vibrations which may have occurred during installation, transport, use and/or storage.

With reference to FIGS. 3 and 9, the method of adjusting set screws 116 and/or focus member 160 to align laser diode mounting system 100 will be described. It is envisioned that the alignment of laser diode mounting system 200 is similar to that described herein and, thus, will not be repeated below.

Initially, laser diode mounting system 100 is fully assembled and fasteners 170 are torqued to a first position sufficient to maintain a suitable compression force on base 110 and cover 150 to retain base 110 and cover 150 in alignment with one another. In this position laser diode mounting system 100 is installed into a mounting plate 400, or other suitable holder or workstation, e.g., via arch-shaped apertures 181, 183 and appropriate mounting fasteners or other suitable retainer members (not shown) extending through cover 150 and base 110, respectively (see FIGS. 1-3). Alternatively, laser diode mounting system 100 may be secured to mounting plate 400 via any other suitable securing mechanism. The mounting plate 400 is configured to permit unobstructed propagation of the emitted laser beam onto a screen, or target. The mounting plate 400 is also configured to permit precision mounting of the laser diode mounting system 100 relative to a defined face and circular edge, such as the distal face 111*b* of base 110 and to provide for mounting at the various predetermined rotational increments about longitudinal axis "Z-Z" as detailed below. Via convention, when laser diode 140 is initially installed into laser diode mounting system 100, laser diode 140 is oriented such that the fast or slow axis of laser diode 140 is oriented in a defined direction, e.g., vertically. Typically, an orientation mark (or tab) on the laser diode 140 corresponding to the fast axis is provided to facilitate orientation of laser diode 140 within laser diode mounting system 100. Similarly, a means is provided on laser diode mounting system 100 to identify the orientation of laser diode 140 when properly mounted therein.

Next, laser diode 140 is powered on such that the emitted laser beam passes through collimating lens 120, ultimately projecting onto a screen, or target that is located on the order of 10 meters away from the laser diode 140. Focus ring 160 is then adjusted, as described above, to focus the image projected onto the screen. As mentioned above, the image may be focused to optimize the fast axis or the slow axis of laser diode 140, or for achieving an intermediate focus therebetween. The image is then recorded on the screen or target.

The laser diode mounting system 100 is then rotated about longitudinal axis "Z-Z" with respect to mounting plate 400, e.g., by removing the fasteners (not shown) installed through arch-shaped apertures 181 and 183 and rotating laser diode mounting system 100 approximately 180 degrees with respect to mounting plate 400. Next, the new image is also recorded on the target. An aligned beam center point may then be estimated based upon the location of a midpoint which bisects a straight line connecting the centers of the each of the images. If the rotation angle were not approximately 180 degrees, then the aligned beam center point may be estimated by forming an isosceles triangle, with its two congruent legs meeting near the center of the apparent arc of the image movement from the first image to the second image. Further, each of the opposite ends of the congruent legs connect the centers of each of the images, and the vertex angle between these congruent legs is made equivalent to the selected rotation angle. This vertex becomes the estimated aligned beam center point.

Using the estimated aligned beam center point determined above as a reference, set screws 116 may be adjusted in order to properly align laser diode 140 with respect to collimating lens 120. The above process may be repeated to confirm or refine the alignment of laser diode mounting system 100. Further, finer increments, e.g., four approximately 90 degree increments, resulting in four recorded images, may be used to increase the precision of alignment, if desired.

Turning now to FIGS. 10-13, another embodiment of a laser diode mounting system is shown identified by reference numeral 200. Laser diode mounting system 200 is similar to laser diode mounting system 100, described above, and generally includes a base, or lens mounting assembly 210 and a cover, or laser diode mounting assembly 250. Base 210 is configured to fixedly retain a collimating lens 220 therein, while cover 250 is configured to fixedly retain a laser diode 240 therein. Base 210 is insertable at least partially into cover 250 such that base 210 and cover 250 may be coupled to one another. Laser diode 240 may then be aligned with respect to collimating lens 220, e.g., by adjusting base 210 and/or cover 250 with respect to one another, according to the precise specification requirements of the laser diode system. Laser diode mounting system 200 may then be secured, i.e., base 210 and cover 250 may be tightened, or locked with respect to one another, to retain collimating lens 220 and laser diode 240 in a fixed position relative to one another. As discussed above regarding laser diode mounting system 100, base 210 and cover 250 are coupled to one another such that the stability and alignment of collimating lens 220 and laser diode 240 is maintained within an acceptable range despite environmental stress cycles such as temperature changes and mechanical vibrations acting on laser diode mounting system 200. The specific tolerances of laser diode mounting system 200 may be similar to those discussed above with regard to laser diode mounting system 100.

With continued reference to FIGS. 10-13, base 210 defines a ring-like configuration having a lumen 212 extending therethrough. A first recess 213a disposed annularly about lumen 212 on a proximal side thereof is defined within proximal end 211a of base 210 and a second, smaller recess 213b is disposed annularly about lumen 212 on a distal side thereof is defined within distal end 211b of base 210. First and second recesses 213a, 213b, respectively, are configured to receive body portion 251 of cover 250 and collimating lens 220, respectively, therein. More particularly, collimating lens 220 is securable within second recess 213b via a retainer ring 222. Retainer ring 222 may include threading 224 disposed on an outer peripheral surface thereof that is complementary to threading 214 disposed on an inner surface of second recess 213b for threadingly engaging retainer ring 222 therein to thereby retain collimating lens 220 therein. However, it is also envisioned that collimating lens 220 be secured or bonded within second recess 213b via any other suitable mechanism, e.g., with an adhesive.

Laser diode mounting ring 230 is configured to fixedly engage, or retain laser diode 240 therein. More specifically, laser diode 240 is insertable into laser diode mounting ring 230 from a proximal side thereof such that laser diode 240 is seated on a shelf 232 defined within laser diode mounting ring 230. Shelf 232 inhibits laser diode 240 from passing distally though laser diode mounting ring 230. Shelf 232 may further provide mechanical keying which engages a feature of the laser diode housing, preventing rotation of the laser diode with respect to mounting ring 230. Laser diode mounting ring 230 may further include an annular indentation on an outer periphery thereof for positioning of a first O-ring, or elastomeric ring 254 therein.

Continuing with reference to FIGS. 10-13, cover 250 is configured to retain laser diode mounting ring 230 and, thus, laser diode 240, therein. More particularly cover 250 includes an annular body portion 251 having a lumen 252 extending therethrough. Lumen 252 of body 251 of cover 250 is configured to accept laser diode mounting ring 230 therethrough, as will be described below. Cover 250 also includes an outer annular flange 255 that defines a channel 257 between body 251 and annular flange 255 for receipt of base 210 therein.

A focus member 260 is operably positionable between laser diode mounting ring 230 or laser diode 240 and cover 250 to couple laser diode mounting ring 230 or laser diode 240 and cover 250 to one another and to adjust the longitudinal position of laser diode mounting ring 230 or laser diode 240 with respect to cover 250. More specifically, focus member 260 includes threading 262 disposed on an outer peripheral surface thereof for engaging complementary threading 258 disposed on an inner surface of lumen 252 of cover 250. Thus, focus member 260 may be rotated clockwise, for example, to translate laser diode 240 distally with respect to cover 250, and may be translated counterclockwise to translate laser diode 240 proximally with respect to cover 250, or vice versa. A central aperture defined within focus member 260 permits passage of electrical connections 242 of laser diode 240 therethrough, such that control electronics connections 244 for laser diode 240 may pass through the proximal side thereof.

Figure 13:
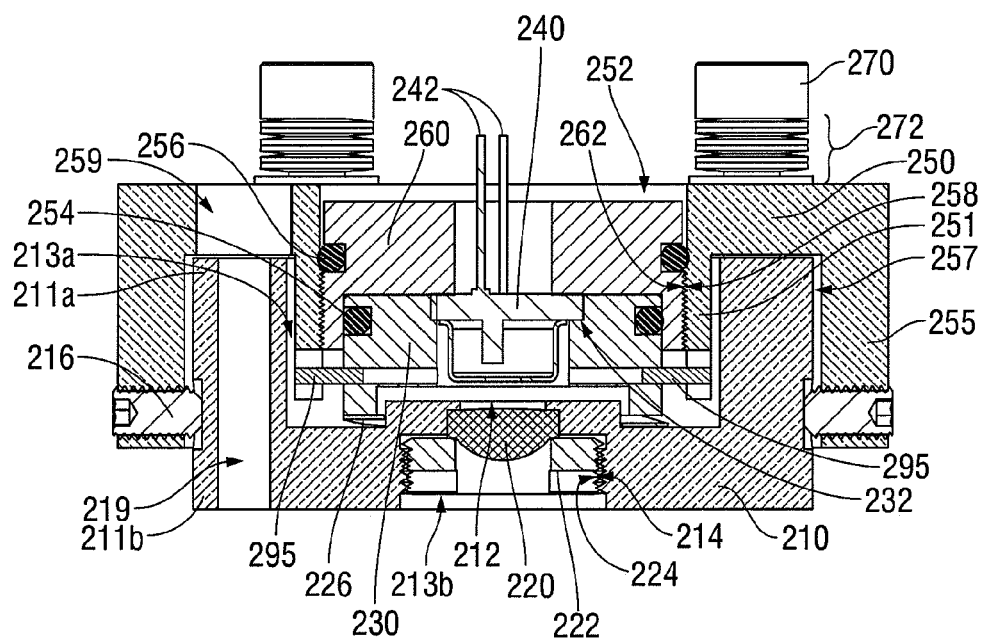
FIG. 13 is a cross-sectional view of the laser diode mounting system of FIG. 10.

As can be appreciated, and as best shown in FIG. 13, once installed between laser diode mounting ring 230 and cover 250, focus member 260 inhibits laser diode 240 from translating proximally out of engagement with shelf 232 of laser diode mounting ring 230. Focus member 260 also retains laser diode mounting ring 230 and cover 250 is a fixed position relative to one another. More particularly, optional first O-ring 254, which protrudes partially from the annular indentation defined within laser diode mounting ring 230, contacts focus member 260 upon positioning of focus member 260 about laser diode mounting ring 230 to maintain the relative position of focus member 260 and laser diode mounting ring 230. A second optional O-ring 256 positioned within an indentation defined on an outer peripheral surface of focus member 260 contacts, or interfaces between focus member 260 and cover 250 upon threading engagement of focus member 260 within lumen 252 of cover 250 to maintain the relative position of focus member 260 and cover 250. Optional first and second O-rings 254, 256, respectively are configured to withstand temperature changes and mechanical vibrations, thereby assisting maintenance of focus member 260, cover 250 and laser diode mounting ring 230 and, thus, laser diode 240, in fixed positions relative to one another after completion of such environmental stress cycles.

With reference again to FIGS. 10-13, during assembly, with collimating lens 220 secured within base 210 and with laser diode 240 secured within laser diode mounting ring 230 (which is positioned relative to cover 250 via focus member 260), cover 250 and base 210 are coupled, or secured to one another. More particularly, base 210 and cover 250 are interfitted with one another such that body portion 251 of cover 250 is positioned within first recess 213a of base 210 and such that the base 210 is disposed within annular channel 257 defined between body portion 251 and annular flange 255 of cover 250. In other words, body portion 251 of cover 250, which includes laser diode mounting ring 230 with laser diode 240 disposed therein, is positioned within base 210, while annular flange 255 of cover 250 is disposed around, or about base 210.

Fasteners 270 optionally including washers 272 are inserted through apertures defined within base 210 and cover 250, respectively, to fasten, or secure base 210 and cover 250 to one another, in the position described above. As in the previous embodiment, fasteners 270 are initially tightened to a first position wherein adjustment and alignment of laser diode mounting system 200 may be effected. Once aligned properly, fasteners 270 are then tightened further to inhibit relative movement of the internal components of laser diode mounting system 200, thus maintaining system 200 in an aligned configuration. Optional Belleville washers 272 permit finer control of the fastening compression provided by fasteners 270 between base 210 and cover 250, where this compression retains base 210 and cover 250 in a fixed relation relative to one another.

First recess 213a of base 210 and body portion 251 of cover 250 are dimensioned such that body portion 251 may be translated transversely with respect to first recess 213a when disposed therein. In other words, body portion 251 of cover 250 may be translated in the plane extending transversely or perpendicularly to longitudinal axis "Z-Z" to adjust the position of laser diode 240 (which is secured therein) with respect to collimating lens 220 (which is secured within base 210). To this end, a plurality of adjustment screws 216 are threadingly engaged within and disposed through annular flange 255 of cover 250 such that an end of each screw 216 abuts an outer surface of base 210. As can be appreciated, screws 216 may be selectively tightened (or loosened) to translate cover 250 in a desired direction with respect to base 210 to thereby adjust the relative position of laser diode mounting ring 230 with laser diode 240 disposed therein with respect to collimating lens 220. Although any number of adjustment screws 216 may be provided, it is envisioned that at least three equally spaced adjustment screws 216 be disposed about annular flange 255 such that cover 250 may be repositioned with respect to base 210 in any direction on a plane extending transversely, or perpendicularly to longitudinal axis "Z-Z."

With continued reference to FIGS. 10-13, focus member 260, as mentioned above, is configured to adjust the longitudinal position of laser diode mounting ring 230 with respect to cover 250, e.g., via clockwise and counterclockwise rotation with respect to cover 250. As such, with cover 250 engaged to base 210, the adjustment of focus member 260 is used for longitudinal adjustment of laser diode 240 with respect to collimating lens 220. As in the previous embodiment, a tool (not shown) may be provided for engaging apertures 269 of focus member 260 in order to rotate focus member 260. As such, the tool (not shown) may be used to adjust the longitudinal position of laser diode 240 with respect to collimating lens 220. Further, one or more compliance members, e.g., a spring, or wave washer 226, may be interdisposed between laser diode mounting ring 230 and base 210 to provide sufficient compression force to maintain the relative position of laser diode 240 with respect to collimating lens 220. Spring washer(s) 226 also provide back pressure on laser diode mounting ring 230 to inhibit backlash during adjustment of focus member 260 and to provide resistance for longitudinal and/or transverse adjustment of laser diode 240 with respect to collimating lens 220.

Arch-shaped apertures 219, 259 defined within base 210 and cover 250, respectively, permit small rotational adjustments of laser diode mounting system 200, e.g., to align the fast axis of laser diode 240 with other components for which laser diode mounting system 200 provides a collimated laser source. Further, anti-rotation keys 295 are provided to inhibit rotation of laser diode mounting ring 230 and, thus laser diode 240, with respect to collimating lens 220 to maintain the alignment thereof.

Laser diode mounting system 200, similar to laser diode mounting system 100, is both longitudinally adjustable, e.g., laser diode 240 is moveable with respect to collimating lens 220 along longitudinal axis "Z-Z," and transversely adjustable, e.g., laser diode 240 is moveable with respect to collimating lens 220 in a plane extending perpendicularly with respect to longitudinal axis "Z-Z." Laser diode mounting system 200 is also configured such that collimating lens 220 and laser diode 240 are securable within base 210 and cover 250, respectively, to minimize the tilt angle between laser diode 240 and collimating lens 220. As mentioned above, where the tilt angle between laser diode 240 and collimating lens 220 is sufficiently small, and the clear aperture of collimating lens 220 is not overfilled, the tilt angle need not be adjusted. Accordingly, the longitudinal and transverse adjustments of laser diode 240 with respect to collimating lens 220 are sufficient to establish a stable, aligned system 200. Laser diode mounting system 200 may further include any of the features discussed above in relation to laser diode mounting system 100. Likewise, the alignment of laser diode mounting system 200 is similar to that described above with respect to laser diode mounting system 100. Additionally, as described above with reference to laser diode mounting system 100, the operable relationships between the various components of laser diode mounting system 200 and the features associated therewith provide a laser diode mounting system 200 capable of maintaining stability and alignment in response to environmental stress cycles such as temperature changes and mechanical vibrations which may occur during installation, transport, use and/or storage.

Figure 14:
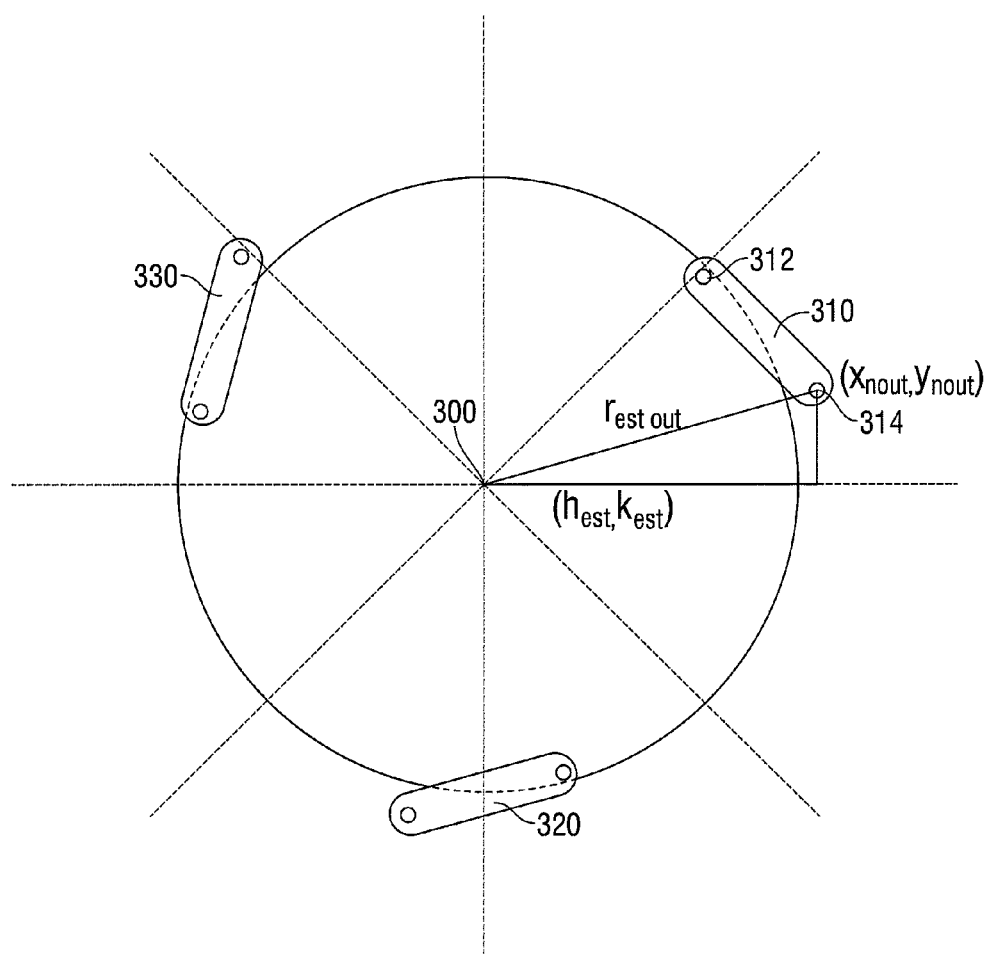
FIG. 14 is a schematic view of a target including recorded beam images thereon for calculating an aligned beam center point of the laser diode mounting system.

Turning to FIGS. 4, 9 and 14, a method of measuring the alignment of laser diode mounting system 100 (and, similarly, laser diode mounting system 200) in accordance with the present disclosure will be described. The method described herein accurately measures the beam pointing characteristics of laser diode mounting system 100, without the need to use a calibrated external target or a precision rotary stage. In other words, the present method provides a simplified method for measuring the alignment of a laser diode mounting system 100 with respect to a reference or mounting surface, e.g., distal face 111b of base 110.

Initially, as described above, laser diode mounting system 100 is fully assembled, aligned, and secured to mounting plate 400. Next, laser diode 140 is powered on such that the emitted laser beam passes through collimating lens 120, ultimately projecting onto the screen, or target that is located on the order of 10 meters away from the laser diode 140. The image is then recorded on the target. Laser diode mounting system 100 is then rotated about longitudinal axis "Z-Z" with respect to mounting plate 400, e.g., by removing fasteners installed through arch-shaped apertures 181 and 183 and rotating laser diode mounting system 100 with respect to mounting plate 400. Laser diode mounting system 100 is rotated in a pre-determined increment about longitudinal axis "Z-Z." More specifically, laser diode mounting system 100 is rotated, for example, in two 180 degree increments, four 90 degree increments, six 60 degree increments, etc. with respect to mounting plate 400, depending on the desired accuracy of alignment. At each incremental position, the laser diode 140 is once again powered on and the new image is recorded on the target.

The calculation of the center points of the recorded images and the aligned beam center point calculated therefrom will now be described with reference to FIG. 14. As mentioned above, each image 310, 320, 330 corresponding to each incremental rotational orientation, e.g., 120 degree steps, is recorded on the target, as shown in FIG. 14. The calculation of the aligned beam center point will be described with reference to three increments, e.g., images of the 0 degree, –120 degree and 120 degree rotational positions 310, 320, 330, respectively, of laser diode mounting system 100 with respect to its holder, although more or fewer increments are contemplated.

As can be appreciated, and as shown in FIG. 14, the images 310, 320, 330 produced by the laser beam from laser diode 140 passing through collimating lens 120 are oval, or, more generally, elliptical in shape, e.g., due to astigmatism in the laser diode 140. Thus, a calculation is required to determine the aligned beam center point 300 of laser diode mounting system 100 based upon these images 310, 320, 330.

First, the two center points of each oval image are determined, based upon approximating the opposing ends of the oval as hemispheres and estimating the radial center of each of these hemispheres. For example, as shown in FIG. 14, image 310 includes a first center 312 and a second center 314. First center 312 of image 310 (and the first centers of the other images) defines an "inner" radius, as it is closer to the aligned beam center point 300. On the other hand, second center 314 of image 310 (and the second centers of the other images) defines an "outer" radius since it is further from the aligned beam center point 300. Second center 314, for example, is located at $(x_{n,out}, y_{n,out})$, wherein the aligned beam center point, or centroid 300 defines the estimated center of the coordinate system, $(h_{est}, k_{est})$. Using these "outer" and "inner" radii of each image 310, 320, 330, an initial estimated centroid 300 is calculated by averaging, e.g., $$h_{est} = \frac{\sum_{n=1}^{N}(x_{n,out} + x_{n,in})}{2 \cdot N},$$

where n refers to a specific oval radius point and N is the total number of such points. A similar formula is used for the y-estimate of the center of the coordinate system, $k_{est}$; substitute y-values for the x-values in the formula for $h_{est}$.

Next, the inner and outer radii are estimated by computing the average distance between each point and the estimated centroid 300, e.g., $$r_{est,out} = \frac{\sum_{n=1}^{N} \sqrt{(x_{n,out} - h_{est})^2 + (y_{n,out} - k_{est})^2}}{N}$$

for the outer radius and using a similar formula for the inner radius $r_{est,in}$, where "in" $(x_n, y_n)$ values are substituted for "out" values in the formula for $r_{est,out}$.

Using the estimated "outer" radii "x" and "y" components, the "x"-component, or $h_{est}$, of the estimated centroid 300 is updated, if possible (e.g., when $h_{est} \neq x_{n,in}$ and $h_{est} \neq h_{est} \neq x_{n,out}$), according to:

$$\Delta h_{est} = \frac{\sum_{n=1}^{N} \left( \begin{array}{l} (x_{n,out} - h_{est}) - \text{sgn}(x_{n,out} - h_{est}) \cdot \\ r_{est,out} \cdot \cos\left(\tan^{-1}\left(\frac{y_{n,out} - k_{est}}{x_{n,out} - h_{est}}\right)\right) + \\ (x_{n,in} - h_{est}) - \text{sgn}(x_{n,in} - h_{est}) \cdot \\ r_{est,in} \cdot \cos\left(\tan^{-1}\left(\frac{y_{n,in} - k_{est}}{x_{n,in} - h_{est}}\right)\right) \end{array} \right)}{2 \cdot N}$$

If one or both of the above inequalities do not hold for a particular value of n, then the corresponding "in" or "out" portion of the numerator of the above equation is not used, and the denominator is decremented by the number of times the inequalities do not hold.

The "y"-component is similarly updated, if possible (e.g., when the same inequalities above hold), according to:

$$\Delta k_{est} = \frac{\sum_{n=1}^{N} \left( \begin{array}{l} (y_{n,out} - k_{est}) - \text{sgn}(x_{n,out} - h_{est}) \cdot \\ r_{est,out} \cdot \sin\left(\tan^{-1}\left(\frac{y_{n,out} - k_{est}}{x_{n,out} - h_{est}}\right)\right) + \\ (y_{n,in} - k_{est}) - \text{sgn}(x_{n,in} - h_{est}) \cdot \\ r_{est,in} \cdot \sin\left(\tan^{-1}\left(\frac{y_{n,in} - k_{est}}{x_{n,in} - h_{est}}\right)\right) \end{array} \right)}{2 \cdot N}$$

Whenever the inequalities do not hold, a different formula is substituted for the portion of the above numerator for which the inequality does not hold, and the denominator is not decremented. In this case, an example of the substitute formula is:

$$v_1 = (y_{n,out} - k_{est}) - \text{sgn}(y_{n,out} - k_{est}) \cdot r_{est,out}$$

which is used as a substitute for the first half of the numerator in the formula for $\Delta k_{est}$. A similar substitution, $v_2$, is used when $h_{est} = x_{n,in}$.

Inner and outer radius estimates $r_{est,in}$ and $r_{est,out}$, respectively, and then centroid position estimates $h_{est}$ and $k_{est}$ are repeated as described above until all four values have converged to within pre-determined limits, e.g., 0.5 image units; then, the correction loop is ended. If $r_{est,out} < r_{est,in}$ after this process is completed, then all "in" and "out" assignments are swapped.

Next, the beam pointing angle ($\alpha$) and the beam pointing direction ($\delta$) are calculated, if possible. The beam pointing angle ($\alpha$) is calculated by determining the center point of each image 310, 320, 330 by averaging the "inner" and "outer" center points thereof and then, using these image center points, calculating radius "r" based upon the average distance between these center points and the centroid ($h_{est}$, $k_{est}$). More specifically, the center point of each image 310, 320, 330 is calculated by $$(x_{n,c}, y_{n,c}) = \left(\frac{x_{n,out} + x_{n,in}}{2}, \frac{y_{n,out} + y_{n,in}}{2}\right).$$

The distances between the centroid 300 and the center point of each image 310, 320, 330, are then averaged to obtain "r."

The beam pointing angle is then calculated according to:

$$\alpha = \tan^{-1}(r/d)$$

where "d" is the distance between the laser diode mounting system 100 (FIG. 2) and the target. This calculation of the beam pointing angle ($\alpha$) is used to ensure that the beam pointing angle ($\alpha$) is within acceptable accuracy limits.

Next, the beam pointing direction ($\delta$) is calculated by determining the average slope of the image ovals 310, 320, 330 relative to an arbitrary standard $s_{standard}$, e.g., the standard beam pointing direction of image 310 is set at 0 degrees, the standard beam pointing direction of the second image 320 is set at −120 degrees and the standard beam pointing direction of the third image 330 is set at 120 degrees. More particularly, the slope $s_{oval}$ of each oval image 310, 320, 330 is calculated based on the line segment connecting the "inner" and "outer" center points of each image 310, 320, 330. The angle of each image 310, 320, 330 relative to the standard may then be calculated according to:

$$\sigma = \tan^{-1}((s_{oval} - s_{standard})/(1 + s_{oval} * s_{standard}))$$

Averaging the slope ($\sigma$) for each image 310, 320, 330 produces $\sigma_{avg}$, which mean is checked to ensure that it is within acceptable precision limits.

The slope ($\rho$) of the radial line segments connecting the centroid ($h_{est}$, $k_{est}$) to the center points ($x_{n,c}$, $y_{n,c}$) of each image 310, 320, 330 is then calculated relative to the standard, similar to the calculation above, where:

$$\rho = \tan^{-1}((s_{radial} - s_{standard})/(1 + s_{radial} * s_{standard}))$$

The slope values ($\rho$) for each image 310, 320, 330 are then adjusted for each case where the rotation of a segment relative to the standard exceeded the range of the arctangent function. In these cases, 180 degrees is added to or subtracted from the slope ($\rho$) value when $\rho \leq 0$ or $\rho > 0$, respectively. An average slope is then calculated using the slope values ($\rho$) for each image 310, 320, 330, both as is ($\rho_{avg}$), and using an adjustment ($\rho'_{avg}$), where $\rho' = \rho + 360°$ such that the slope values are all positive. The average slope value $\rho_{avg}$ or $\rho'_{avg}$ with the lowest standard deviation is then selected and defined as $\rho_0$. If both standard deviations are the same, then $\rho_{avg}$ is selected.

From the above, the beam pointing direction angle is calculated by:

$$\delta = \rho_0 + \sigma$$

Finally, the beam pointing direction angle $\delta$ may be converted into a "time" value t according to:

$$t = t_0 - \delta/720$$

where $t_0 = 0.125$ if $\delta \leq 90°$ and where $t_0 = 0.625$ if $\delta > 90°$. The range of the resulting "time," t, is [0, 0.5), which can be directly correlated to the position of the hour hand on an analog clock face, indicating times in the range [0:00, 12:00).

It is then determined whether the minimum standard deviation of "t" is within acceptable limits. If the beam pointing direction angle is not within acceptable limits, this may indicate that the laser diode mounting system is unstable. Alternatively, where the beam pointing angle is very small, moving the target farther from or closer to laser diode mounting system 100 and then repeating the measurements may bring the beam pointing direction angle variability back to within acceptable limits.

The above description assumed the laser diode is astigmatic, with fast and slow axes distinguishable at far field. If the laser diode is stigmatic, e.g., a vertical-cavity surface-emitting laser (VCSEL), then the above analysis is simplified considerably. The beam pointing angle is determined by first estimating a centroid, ($h_{est}$, $k_{est}$), where $$h_{est} = \frac{\sum_{n=1}^{N} x_n}{N} \text{ and } k_{es} = \frac{\sum_{n=1}^{N} y_n}{N}$$

and the points ($x_n$, $y_n$) are determined from the estimated centers of the projected round image spot, and using the notation developed above. Next, the radius is estimated according to:

$$r_{est} = \frac{\sum_{n=1}^{N} \sqrt{(x_n - h_{est})^2 + (y_n - k_{est})^2}}{N}$$

Then, additive corrections to the centroid estimates are made according to:

$$\Delta h_{est} = \frac{\sum_{n=1}^{N} \left((x_n - h_{est}) - \text{sgn}(x_n - h_{est}) \cdot r_{est} \cdot \cos\left(\tan^{-1}\left(\frac{y_n - k_{est}}{x_n - h_{est}}\right)\right)\right)}{N}$$

and $$\Delta k_{est} = \frac{\sum_{n=1}^{N} \left((y_n - k_{est}) - \text{sgn}(x_n - h_{est}) \cdot r_{est} \cdot \sin\left(\tan^{-1}\left(\frac{y_n - k_{est}}{x_n - h_{est}}\right)\right)\right)}{N}$$

The same restrictions on non-zero differences in the denominators of the above equations hold, as described previously, but with substitute value in the sum for $\Delta k_{est}$ $$v = (y_n - k_{est}) - \text{sgn}(y_n - k_{est}) \cdot r_{est}$$

Radius estimate $r_{est}$, and then centroid position estimates $h_{est}$ and $k_{est}$ are repeated as described above until all three values have converged to within pre-determined limits, e.g., 0.5 image units; then, the correction loop is ended.

The beam point angle is then calculated according to:

α=tan⁻¹($r_{est}$/d)

where "d" is the distance between the laser diode mounting system 100 (FIG. 2) and the target. Beam pointing direction angle δ is in the case of a stigmatic laser diode indeterminate unless polarization of the captured images is also measured.

The measurement of beam pointing angle and beam pointing angle direction may be partially or fully automated, e.g., through use of a computer to automatically perform the calculations; identify image ellipses or ovals first traced onto a paper target; determine inner and outer center points through image processing; or obtain image ellipses or ovals through focusing these onto an image sensor.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. An optical system, the optical system comprising:
   a laser diode;
   a collimating lens;
   a housing assembly including first and second housing parts, the first housing part configured to retain the collimating lens therein, the second housing part being engageable with the first housing part to retain the laser diode therebetween, a position of the laser diode being selectively adjustable with respect to the collimating lens in an X direction, a Y direction, and a Z direction;
   at least one biasing member interdisposed between the first and second housing parts in at least one of the X direction, the Y direction, and the Z direction, the at least one biasing member configured to bias the laser diode relative to the collimating lens in at least one of the X direction, the Y direction, and the Z direction; and
   at least one securing member for fixedly engaging the first and second housing parts to one another, the at least one securing member providing a compression force on the first and second housing parts to maintain the relative position of the laser diode with respect to the collimating lens in the X direction, the Y direction and the Z direction.

2. The optical system according to claim 1, further comprising at least one adjustment member for adjusting the position of the laser diode with respect to the collimating lens in at least one of the X direction, the Y direction and the Z direction.

3. The optical system according to claim 2, further comprising at least three adjustment members positioned radially about an outer peripheral surface of one of the first and second housing parts, the at least three adjustment members being selectively moveable to adjust the position of the laser diode with respect to the collimating lens in a plane defined by the X direction and the Y direction.

4. The optical system according to claim 1, wherein each securing member includes a plurality of compression washers disposed therearound, the washers configured to provide finer control of the compression force between the first and second housing parts upon engagement of the securing member to the first and second housing parts.

5. The optical system according to claim 1, further comprising a focus member threadingly engaged to the second housing part and configured to selectively translate the laser diode with respect to the collimating lens along a longitudinal axis defined therethrough.

6. The optical system according to claim 1, further comprising at least one spring interdisposed between the first housing part and the second housing part to positionally bias the laser diode apart from the collimating lens.

7. The optical system according to claim 6, further comprising a plurality of set screws coupled to the first housing part, the set screws being selectively adjustable to maintain the positional biasing of the laser diode apart from the collimating lens.

8. The optical system according to claim 1, further comprising a laser diode mounting member configured to retain the laser diode therein, the laser diode mounting member being positionable between the first and second housing parts and configured such that, upon engagement of the first and second housing parts, the relative position of the laser diode with respect to the collimating lens is maintained.

9. The optical system according to claim 8, wherein the laser diode mounting member is selectively adjustable with respect to the collimating lens in the X direction, the Y direction, and the Z direction for selectively adjusting the position of the laser diode with respect to the collimating lens in the X direction, the Y direction, and the Z direction.

10. The optical system according to claim 8, further comprising a first retainer ring configured to threadingly engage the laser diode mounting member to retain the laser diode therein.

11. The optical system according to claim 1, further comprising a second retainer ring configured to threadingly engage the first housing part to retain the collimating lens therein.

12. The optical system according to claim 1, wherein the engagement of the at least one securing member with the first and second housing parts is configured to maintain an accurate positional alignment of the laser diode relative to the collimating lens after application of at least 10 $G_{RMS}$ random axis vibration for 10 minutes.

13. The optical system according to claim 1, wherein the engagement of the at least one securing member with the first and second housing part is configured to maintain an accurate positional alignment of the laser diode relative to the collimating lens after a temperature cycle of room temperature to −40° C. to 65° C. and back to room temperature.

14. The optical system according to claim 1, wherein alignment of the laser diode with respect to the collimating lens is effected by adjusting the relative position of the laser diode with respect to the collimating lens along a longitudinal axis defined therethrough and in a plane extending transverse to the longitudinal axis.

15. The optical system according to claim 14, wherein a relative tilt of the laser diode with respect to the collimating lens remains fixed during alignment of the laser diode with respect to the collimating lens.

16. A method for aligning an optical system mounted to a mounting plate, the optical system including first and second housing parts wherein the first housing part is configured to retain a collimating lens therein, the second housing part being engageable with the first housing part to retain the laser diode therebetween, the method comprising the steps of:
   translating the laser diode with respect to the collimating lens along a longitudinal axis defined therethrough to focus an image produced by the optical system on a far-field target, a relative rotational position of the laser diode with respect to the collimating lens being fixed during translation of the laser diode;

recording a first image produced by the optical system on the target with the optical system in a first rotational orientation;

rotating the optical system a pre-determined angle of rotation with respect to the mounting plate;

recording a second image produced by the optical system on the target with the optical system in a second rotational orientation;

determining an aligned beam center point based upon the first and second recorded images and the pre-determined angle of rotation of the optical system between the first and second recorded images; and translating the laser diode transversely with respect to the collimating lens to align an image produced by the optical system with the aligned beam center point.

17. The method according to claim 16, wherein the first and second housing parts are secured to one another under a first securing pressure at each rotational position.

18. The method according to claim 17, further comprising the step of securing the first and second housing parts to one another under a second securing pressure that is greater than the first securing pressure once the optical system has been aligned to thereby fix the laser diode and the collimating lens in position relative to one another.

19. The method according to claim 18, further comprising the step of measuring a beam pointing angle and a beam pointing direction of the optical system using an external target requiring only rough alignment and simple mechanical mounting methods.

20. The method according to claim 19, wherein the optical system is rotated through a plurality of equal, pre-determined angles of rotation with respect to the mounting plate and wherein an image produced by the optical system on the target is recorded at each of the pre-determined angles of rotation in order to measure the beam pointing angle and the beam pointing direction of the optical system.

21. The method according to claim 16, wherein determining the aligned beam center point includes the steps of:

determining a center of each of the first and second recorded images; and determining the aligned beam center point based upon the determined center of each of the first and second recorded images and the angle of rotation of the optical system between the first and second recorded images.

22. The method according to claim 16, wherein the optical system is rotated through a plurality of equal, pre-determined angles of rotation with respect to the mounting plate and wherein an image produced by the optical system on the target is recorded at each of the pre-determined angles of rotation.

23. The method according to claim 16, wherein the optical system is aligned to optimize resolution of an astigmatic laser diode in one of a fast axis of the laser diode and a slow axis of the laser diode.

* * * * *